(12) United States Patent
Gray et al.

(10) Patent No.: US 10,983,710 B1
(45) Date of Patent: Apr. 20, 2021

(54) UNEVEN DISTRIBUTED STORAGE ACROSS A MESH FABRIC STORAGE SYSTEM

(71) Applicant: Open Drives LLC, Culver City, CA (US)

(72) Inventors: Scot Gray, Culver City, CA (US); Sean Lee, Culver City, CA (US)

(73) Assignee: Open Drives LLC, Culver City, CA (US)

( * ) Notice: Subject to any disclaimer, the term of this patent is extended or adjusted under 35 U.S.C. 154(b) by 0 days.

(21) Appl. No.: 17/100,633

(22) Filed: Nov. 20, 2020

Related U.S. Application Data

(63) Continuation of application No. 16/896,053, filed on Jun. 8, 2020, now Pat. No. 10,852,963.

(51) Int. Cl.
*G06F 3/06* (2006.01)
*G06F 12/00* (2006.01)
*G06F 11/07* (2006.01)

(52) U.S. Cl.
CPC ............ *G06F 3/0619* (2013.01); *G06F 3/067* (2013.01); *G06F 3/0617* (2013.01); *G06F 3/0631* (2013.01); *G06F 3/0649* (2013.01); *G06F 3/0653* (2013.01); *G06F 3/0659* (2013.01); *G06F 3/0683* (2013.01); *G06F 11/076* (2013.01)

(58) Field of Classification Search
CPC .... G06F 3/0619; G06F 3/0617; G06F 3/0631; G06F 3/0649; G06F 3/0653; G06F 3/0659; G06F 3/067; G06F 3/0683; G06F 11/076; G06F 12/00; G06F 13/00
USPC .......................................... 711/100, 154, 200
See application file for complete search history.

(56) References Cited

U.S. PATENT DOCUMENTS

| | | | |
|---|---|---|---|
| 9,641,615 B1 | 5/2017 | Robins et al. | |
| 2010/0332750 A1* | 12/2010 | Hooton | G06F 3/0689 711/114 |
| 2013/0067187 A1 | 3/2013 | Moss et al. | |
| 2018/0278082 A1 | 9/2018 | Wu et al. | |
| 2019/0332526 A1* | 10/2019 | Xu | G06F 3/061 |
| 2020/0097186 A1* | 3/2020 | Johnson | G06F 11/1076 |

* cited by examiner

*Primary Examiner* — Tuan V Thai
(74) *Attorney, Agent, or Firm* — Ansari Katiraei LLP; Arman Katiraei; Sadiq Ansari

(57) ABSTRACT

An uneven distributed storage across a mesh fabric storage system may include receiving storage operations from one or more client devices and/or applications contemporaneously with receiving availability messaging from a set of multiple storage devices that may be of the same or different types. One or more of the storage operations may be assigned to a storage device that has signaled its readiness to perform the one or more storage operations via an issued availability message. Each storage device may thereby perform a subset of the collective set of storage operations with the uneven distribution allocating load that is directly commensurate with the performance of each storage device. Stored data may be moved between storage devices using a similar availability-driven methodology so as to reallocate capacity usage while still providing the fastest storage performance associated with all storage devices writing the data as it is generated.

18 Claims, 7 Drawing Sheets

US 10,983,710 B1

UNEVEN DISTRIBUTED STORAGE ACROSS A MESH FABRIC STORAGE SYSTEM

CLAIM OF BENEFIT TO RELATED APPLICATIONS

This application is a continuation of U.S. nonprovisional application Ser. No. 16/896,053 entitled "Uneven Distributed Storage Across A Mesh Fabric Storage System", filed Jun. 8, 2020, now U.S. Pat. No. 10,852,963. The contents of application Ser. No. 16/896,053 are hereby incorporated by reference.

BACKGROUND INFORMATION

Storage operations have remained a bottleneck in computer performance. Computer processors, volatile memory, and network bandwidth can transfer and/or process gigabytes worth of data every second. However, the fastest non-volatile storage devices, including solid-state disks and flash memory, are multiple times slower. Mechanical and/or magnetic storage devices are even slower still. For data-intensive systems and applications, such as video editing and video rendering, storage bottlenecks can hinder productivity, delay timelines, increase costs, and/or even stymie innovation.

Systems that produce large amounts of data may need extremely fast storage access, and also large amounts of storage. Faster storage typically comes at the expense of larger storage. For instance, solid-state disks and flash memory may be significantly faster than mechanical and/or magnetic storage devices, but offer significantly less storage for the same price.

DETAILED DESCRIPTION OF PREFERRED EMBODIMENTS

Figure 1:
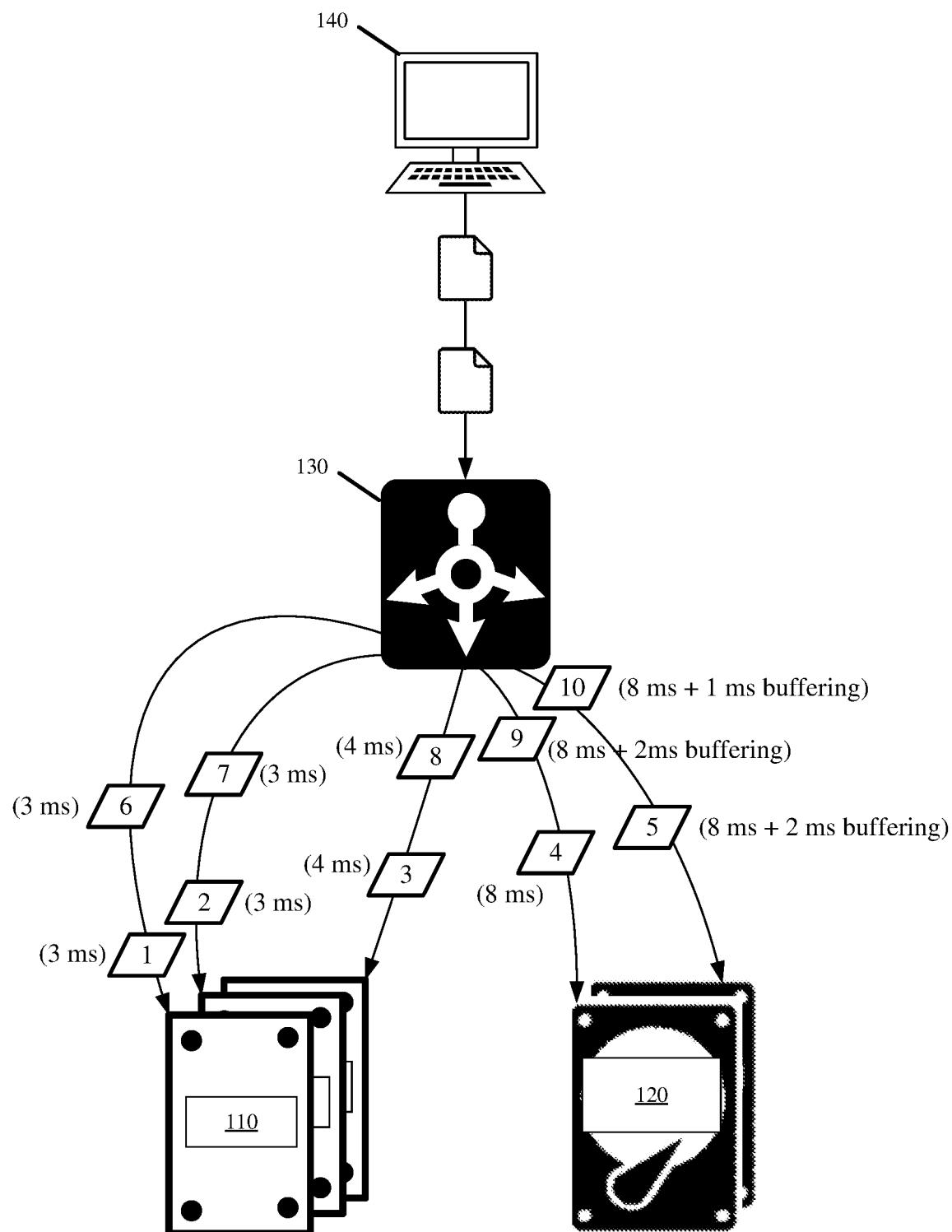
FIG. 1 illustrates an example of evenly distributing storage operations in a mesh fabric storage system.

The following detailed description refers to the accompanying drawings. The same reference numbers in different drawings may identify the same or similar elements.

Systems and/or methods, as described herein, provide uneven distributed storage across a mesh fabric storage system for improved storage performance. In some embodiments, the mesh fabric storage system may include a set of multiple storage devices that may be of the same or different types. For instance, the mesh fabric storage system may include a mix of different solid-state, flash, mechanical, optical, magnetic, and/or other storage devices or storage technologies. The storage devices of the mesh fabric storage system may be local to a computer workstation that generates the data and/or storage operations for storage across the mesh fabric storage system. Alternatively, the storage devices of the mesh fabric storage system may be remote to one or more workstations, and may be used to store and access data that is generated by the one or more workstations.

By distributing the storage operations across the set of storage devices, each storage device may perform a subset of the collective set of storage operations generated by the one or more workstations. For instance, four storage devices may each write one fourth of the collective set of storage operations generated by a workstation, thereby completing the collective set of storage operations significantly faster (e.g., one fourth the time) than would be possible with a single storage device.

The uneven distribution may also maximize storage performance by unequally distributing load across slower storage devices and faster storage devices in the set of storage devices (e.g., the mesh fabric storage system). The unequal distribution may prevent the slower storage devices from slowing overall storage performance by disproportionately shifting load to the faster storage devices. For instance, an even round robin distribution across three faster flash memory-based storage devices and one slower mechanical disk may result in one fourth of the storage operations taking significantly longer to complete because of the slower performance of the mechanical disk. The slower performance of the mechanical disk and the even distribution of load across the example set of storage devices may cause every fourth storage operation to be slower relative to other storage operations, and total storage performance to be disproportionality affected by the slower performance of the mechanical disk. Conversely, the uneven distribution enables the set of storage devices to perform as fast as the fastest storage device in the set of storage devices. For instance, rather than provide the slower mechanical disk every fourth operation, the uneven distribution may provide the slower mechanical disk a storage operation with less frequency and dynamically based on the availability of the mechanical disk. Accordingly, the systems and methods may effectively provide flash memory-based performance even when the set of storage device include a single flash memory-based storage device and one or more slower mechanical and/or magnetic disks.

FIG. 1 illustrates an example of evenly distributing storage operations in a mesh fabric storage system. As shown in FIG. 1, the mesh fabric storage system comprises one or more fast performing storage devices 110 and one or more slow performing storage devices 120. Even distribution file system 130 distributes storage operations (e.g., reads and writes) that are generated by at least one workstation 140 evenly across storages devices 110 and 120.

Fast performing storage devices 110 may include solid-state disks, flash memory, optical storage devices, and/or other storage devices that store and/or access data without moving components. Slow performing storage devices 120 may include magnetic disks, storage devices that write to physical media, and/or other mechanical storage devices that store and/or access data via moving components.

The mesh fabric storage system may be scaled to include any number, combination, and/or type of storage device. For instance, the mesh fabric storage system may include three fast performing storage devices 110 and two slow performing storage devices 120 with the storage devices 110 and 120 coming from different manufacturers, with different storage capacities, and/or different storage performance.

Other factors, besides the underlying storage technology, may affect the storage performance of storage devices 110 and 120. For instance, network latency for communications between file system 130 and storage devices 110 and 120 may impact availability of storage devices 110 and 120. Similarly, a first storage device that has a lower percentage of unused capacity (e.g., a greater percentage of used capacity) than an otherwise identical second storage device may be slower performing because the second storage device is able to perform more sequential writes, whereas the first storage device may have to perform slower random writes to nonsequential blocks.

Using different block sizes to read and write data may also affect performance of otherwise identical storage devices. Performance of storage devices 110 and 120 may also be affected based on the input/output stream or sequence of storage operations that are generated. For instance, a sequence of read operations may be issued and may target data that is stored to a first storage device, thereby making that first storage device unavailable for write operations.

In some embodiments, storage devices 110 and 120 may operate as one or more storage nodes that are remote from the machine on which file system 130 and/or workstation 140 run. In some such embodiments, storage nodes may be accessed by file system 130 and/or workstation 140 via one or more networks. For instance, the networks may support gigabit speeds (e.g., 1, 10, 100 gigabits per second), and therefore have sufficient speeds to exceed the storage performance of each individual storage device 110 or 120, and/or the collective set of storage devices 110 and 120. Ethernet, fiber channel, and/or other networking technologies may be used to connect a remote mesh fabric storage system to file system 130 and/or workstation 140.

In some embodiments, storage devices 110 and 120 may be local to and/or running on the same machine as file system 130 and/or workstation 140. In some such embodiments, storage devices 110 and 120 may be connected to mesh fabric file system 130 with even higher speed and/or higher bandwidth interfaces. Example of interfaces for directly connecting the mesh fabric storage system to file system 130 and/or workstation 140 may include advanced technology attachment (ATA), small computer system interface (SCSI), serial attached SCSI (SAS), and/or peripheral component interconnect express (PCIe).

File system 130 may provide and control access to storage devices 110 and 120. For instance, mesh fabric file system 130 may control reading and writing of data across storage devices 110 and 120.

File system 130 may use metadata to track data and/or blocks of the same file that are stored across one or more of storage devices 110 and 120. The data may be generated by one or more workstations 140 that use file system 130 for access to (e.g., read from and write to) storage devices 110 and 120. File system 130 may obscure the different storage devices 110 and 120 from workstation 140. In other words, mesh fabric file system 130 may present storage devices 110 and 120 to workstation 140 as a single logical storage device/system with file system 130 controlling and/or tracking the physical storage of a file or data across two or more of storage device 110 and/or 120.

As shown in FIG. 1, file system 130 may receive one or more files and/or data from workstation 140, and may evenly distribute storage operations associated with the received files and/or data across storage device 110 and 120. For instance, in FIG. 1, file system 130 may perform a round robin distribution in which each block or a set of blocks designated for storage are sent to a different storage device in a particular order. Other even distributions may result in similar performance. An even distribution may be used for its simplicity, and/or to balance load and storage usage across storage devices 110 and 120.

FIG. 1 illustrates an example amount of time associated with completing each storage operation at each storage device 110 and 120 based on different performance of storage devices 110 and 120. FIG. 1 also illustrates total time 150 to complete all storage operation based on the even distribution and performance of storage devices 110 and 120.

File system 130 may be based on the ZFS file system or other file system that supports a mesh fabric storage system that is either locally or remotely accessible. File system 130 may operate on a storage controller that is on a device separate from or local to workstation 140. For instance, file system 130 may provide two or more workstations 140 access to storage devices 110 and 120. Alternatively, file system 130 may run directly on workstation 140 (e.g., as a process or component of the operating system), and provide workstation 140 access to storage devices 110 and 120.

Workstation 140 may include any computer or device that generates data, and that relies on file system 130 to manage storage and/or access to the data across storage devices 110 and 120. The data may be generated by one or more applications running on workstation 140, and the storage operations may include reading and/or writing the data to storage devices 110 and 120.

Figure 2:
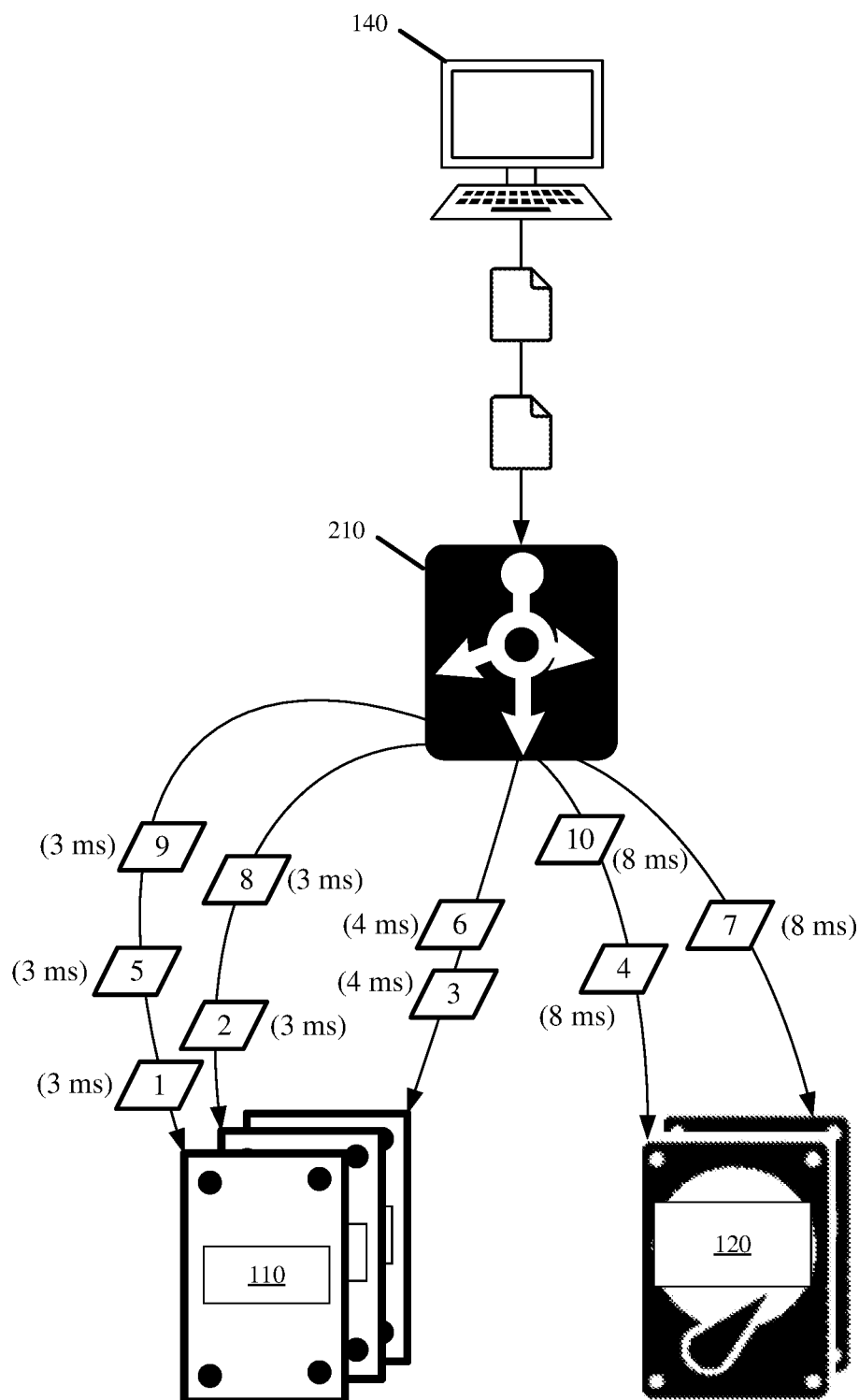
FIG. 2 illustrates an example of unevenly distributing storage operations in a mesh fabric storage system in accordance with some embodiments described herein.

FIG. 2 illustrates an example of unevenly distributing storage operations in a mesh fabric storage system in accordance with some embodiments described herein. FIG. 2 replaces even distribution file system 130 of FIG. 1 with uneven distribution file system 210. Uneven distribution file system 210 does not provide an ordered distribution of storage operations across storage devices 110 and 120. Instead, uneven distribution file system 210 may change the rate and frequency with which storage operations are assigned to different storage devices 110 and 120.

In some embodiments, file system 210 may perform the uneven distribution based on availability of each of storage devices 110 and 120. For instance, file system 210 may issue a storage operation to a storage device, that has signaled to file system 210, that the storage device is prepared to execute one or more storage operations. A storage device may signal that its storage operation buffer is empty, will be empty within a period of time, or the storage operation buffer is less than a threshold amount full.

Two or more of storage devices 110 and 120 may simultaneously or contemporaneously become available to receive and execute a storage operation from file system 210. File system 210 may provide a next storage operation to the storage device from the two or more storage devices that was last to receive a prior storage operation, has the least used capacity or least percentage of used capacity, is the slowest performing storage device, and/or other criteria for selecting between available storage devices.

The resulting uneven distribution maximizes performance of the mesh fabric storage system by ensuring that the distributed storage operations will be completed immediately or essentially instantaneously by a receiving storage device upon receipt, and will not be queued or otherwise buffered for later completion. The uneven distribution further maximizes performance by taking advantage of the performance difference between storage devices 110 and 120 such that the fast performing storage devices 110 are not left idle simply because load is evenly being distributed across slow performing storage devices 120, and slow performing storage devices 120 do not delay overall performance because they cannot keep up with an evenly distributed load. In other words, the uneven distribution produced by the embodiments described herein provides storage devices 110 and 120 with load that is commensurate with actual performance of storage devices 110 and 120 rather than load that is evenly distributed across storage devices 110 and 120.

Total completion time 220 illustrates the performance advantage of the uneven distribution of storage operations versus the even distribution of storage operations illustrated in FIG. 1. In particular, the uneven distribution provides a greater load (e.g., more storage operations) to fast performing storage device 110 and a lesser load to slow performing storage devices 120, which in turn takes greater advantage of the performance different between storage devices, but also minimizes overloading and/or buffering at any particular storage device.

Figure 3:
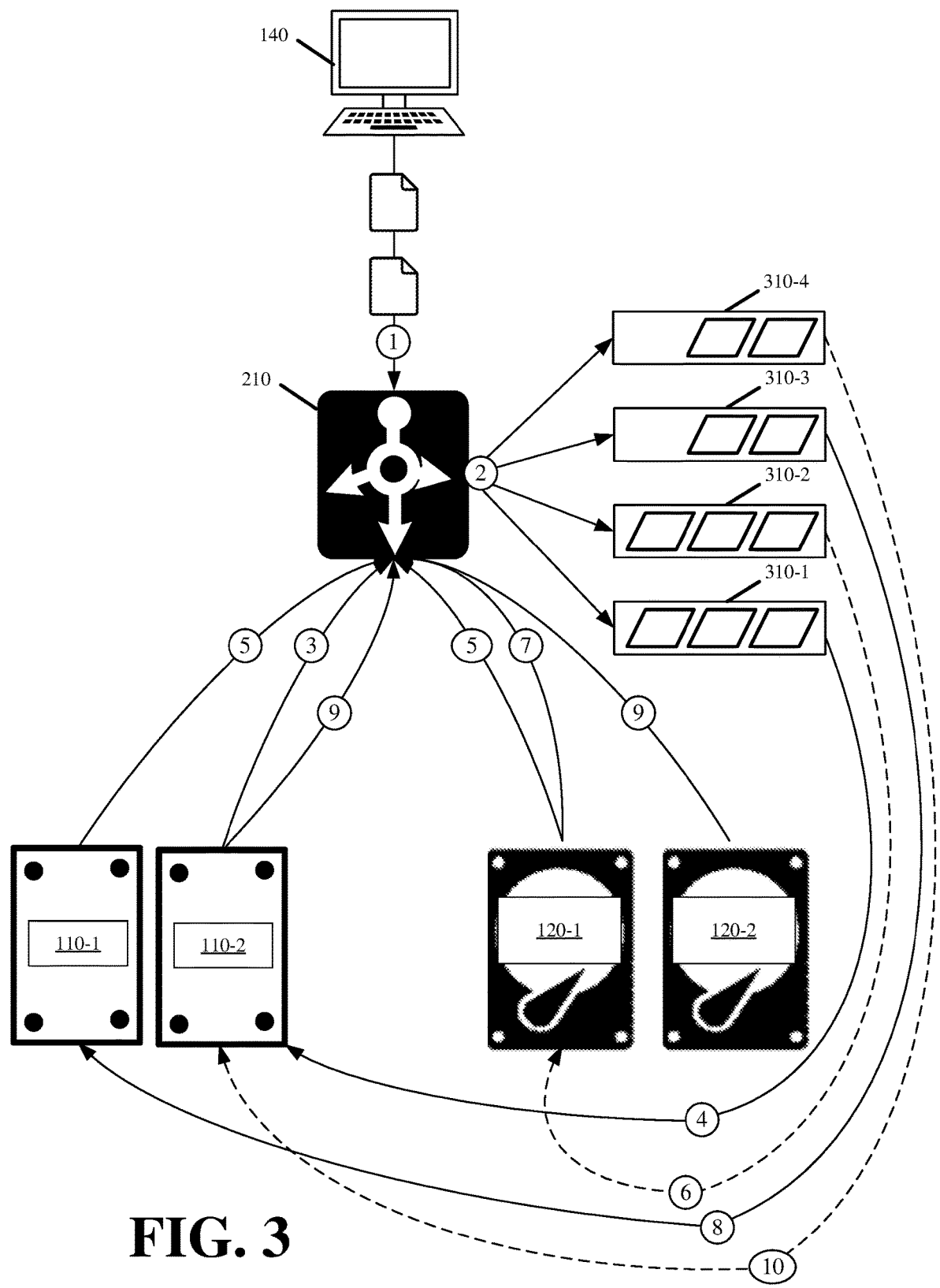
FIG. 3 illustrates an example of the availability-driven uneven distribution of storage operations in a mesh fabric storage system in accordance with some embodiments described herein.

FIG. 3 illustrates an example of the availability-driven uneven distribution of storage operations in a mesh fabric storage system in accordance with some embodiments described herein. FIG. 3 illustrates storage devices 110 including first storage device 110-1 and second storage device 110-2, and storage devices 120 including third storage device 120-1 and fourth storage device 120-2. FIG. 3 also illustrates different slots 310-1, 310-2, 310-3, and 310-4 (herein sometimes collectively referred to as "slots 310" or individually as "slot 310").

File system 210 may receive (at 1) different storage operations from workstation 140 over time, and may populate (at 2) each slot 310 with one or more of the received storage operations. File system 210 may populate (at 2) each slot 310 as the storage operations are received (at 1), or may first enter the received storage operations in a queue before populating (at 2) slots 310. File system 210 may reorder the storage operations when populating (at 2) slots 310.

Contemporaneously and/or at different times corresponding to file system 210 populating (at 2) different slots 310, file system 210 may receive (at 3, 5, 7, and 9) availability messages from one or more of storage devices 110-1, 110-2, 120-1, and/or 120-2. A storage device (e.g., storage devices 110-1, 110-2, 120-1, and/or 120-2) may provide an availability message to file system 210 when that storage device is idle (e.g., has no pending read and/or write operations to perform), or when a storage operation buffer of the storage device is less than a percentage full (e.g., when a 10 megabyte buffer is less than 3 megabytes full). The availability messages may be provided via a network and/or other interface that communicably couples file system 210 to storage devices 110-1, 110-2, 120-1, and/or 120-2. The availability messages may be exchanged using a lightweight protocol. In some embodiments, the availability messages may provide an identifier associated with a sending storage device 110-1, 110-2, 120-1, or 120-2. For instance, a particular availability message may provide the Internet Protocol (IP) address, Media Access Control (MAC) address, domain name, and/or other value that uniquely identifies a particular storage device from storage devices 110-1, 110-2, 120-1, and 120-2. File system 210 may track availability of storage devices 110-1, 110-2, 120-1, and/or 120-2 based on the received (at 3, 5, 7, and 9) availability messages, and may distribute (at 4, 6, 8, and 10) storage operations assigned to slots 310 based on the identified storage device availability.

For instance, at or before distributing (at 4) the storage operations associated with slot 310-1, file system 210 may receive (at 3) an availability message from second storage device 110-2, and may issue (at 4) a first set of storage operations that have been allocated to slot 310-1 by file system 210 over to the second storage device 110-2. File system 210 may also track metadata that identifies the storage of the data associated with the first set of storage operations to the second storage device 110-2.

At or before distributing (at 6) the storage operations associated with slot 310-2, file system 210 may receive (at 5) availability messages from first storage device 110-1 and third storage device 120-1. File system 210 may select between first storage device 110-1 and third storage device 120-1 using one or more criteria. In this figure, file system 210 selects third storage device 120-1, and issues (at 6) a second set of storage operations that have been allocated to slot 310-2 by file system 210 to third storage device 120-1.

At or before distributing (at 8) the storage operations associated with slot 310-3, file system 210 may receive (at 7) another availability message from third storage device 120-1 (e.g., the write buffer of third storage device 120-1 may have not been filled by the storage operations associated with slot 310-2). File system 210 may also track availability of first storage device 110-1 that previously announced (at 5) its availability. File system 210 may select between first storage device 110-1 and third storage device 120-1 for a third set of storage that have been allocated by file system 210 to slot 310-3. As shown, file system 210 may select first storage device 110-1 over third storage device 120-1 to better balance storage usage and actual load because first storage device 110-1 has not performed a set of storage operations as recently as third storage device 120-1. Based on the selection, file system 210 may provide (at 8) the third set of storage operations to storage device 110-1.

At or before distributing (at 10) a fourth set of storage operations associated with slot 310-4, file system 210 may receive (at 9) availability messages from storage devices 110-2 and 120-2 in addition to the previously tracked (at 7) availability message from third storage device 120-1. File system 210 may select between storage devices 110-2, 120-1, and 120-2 to perform the fourth set of storage operations that have been allocated by file system 210 to slot 310-4. For this selection, file system 210 may disqualify or remove first storage device 120-1 because first storage device 120-1 is the storage device from the set of storage devices 110-2, 120-1, and 120-2 that most recently performed a set of storage operations (e.g., the third set of storage operations associated with slot 310-3). File system 210 may then select second storage device 110-2 over fourth storage device 120-2 in response to tracking available storage space on each storage device 110-2 and 120-2, and determining that the unused storage or unused storage percentage on second storage device 110-2 is greater than the unused storage or unused storage percentage on fourth storage device 120-2. Performance of each storage device 110-2 and 120-2 and other factors may also contribute to the selection made by file system 210. Based on the selection of second storage device 110-2, file system 210 may distribute (at 10) the fourth set of storage operations associated with slot 310-4 to second storage device 110-2 for execution.

FIG. 3 illustrates a mesh fabric file system that performs an uneven distribution in which second storage device 110-2 receives and completes two sets of storage operations associated with slots 310-1 and 310-4, while fourth storage device 120-2 does not receive storage operations during any of slots 310 even though fourth storage device 120-2 is available during slot 310-4.

In the event that no storage devices are available for execution of the storage operations that have been allocated to a slot, file system 210 may queue, in local memory and/or local storage, the storage operations and/or slot until one or more storage devices are available. Alternatively, file system 210 may select one of the storage devices 110-1, 110-2, 120-1, and/or 120-2 based on prior availability, prior capacity, and/or other monitored conditions, and may send the storage operations to a selected storage device with the selected storage device queuing the storage operations in its buffer.

For instance, file system 210 may determine second storage device 110-2 to be the fastest performing storage device of storage devices 110-1, 110-2, 120-1, and 120-2 (e.g., the mesh fabric storage system) based on frequency and/or timestamps of availability messages that file system 210 receives (at 3 and 9) from second storage device 110-2, and may select to queue a set of storage operations at second storage device 110-2 even when no availability message is received from second storage device 110-2. File system 210 may then identify third storage device 120-1 as the next fastest performing storage device of the mesh fabric storage system based on the frequency and/or timestamps of the availability messages that file system 210 receives (at 5 and 7) from third storage device 120-1, and may select to queue a subsequent set of storage operations at third storage device 120-1 even when no availability message is received from third storage device 120-1.

As another example, file system 210 may determine that storage devices 110-2 and 120-1 are twice as fast as storage devices 110-1 and 120-2 based on the frequency and timestamps provided by each storage device 110-1, 110-2, 120-1, and 120-2. In this example, file system 210 may unevenly distribute and queue twice the load or twice the number of storage operations on storage devices 110-2 and 120-1 than on storage devices 110-1 and 120-2.

An advantage of the availability-driven uneven distribution of storage operations is that storage devices may be added at any time as the system continues to run. Moreover, the availability-driven uneven distribution supports different kinds of storage devices with different capacities and/or performance, and maximizes performance regardless of the mix of storage devices.

Addition of a new storage device may involve configuring the storage device with a unique identifier and addressing to send the unique identifier to file system 210 when the newly added storage device is available for additional storage operations. File system 210 may receive the availability message from the newly added storage device, distribute storage operations to the new storage device in response to receiving the availability message from the storage device, and may track data that is stored to the new storage device for reading, updating, purging, and/or other accessing. File system 210 may also learn performance characteristics of the newly added storage device over time by tracking the frequency and/or rate by which the newly added storage device sends the availability messages to file system 210.

Figure 4:
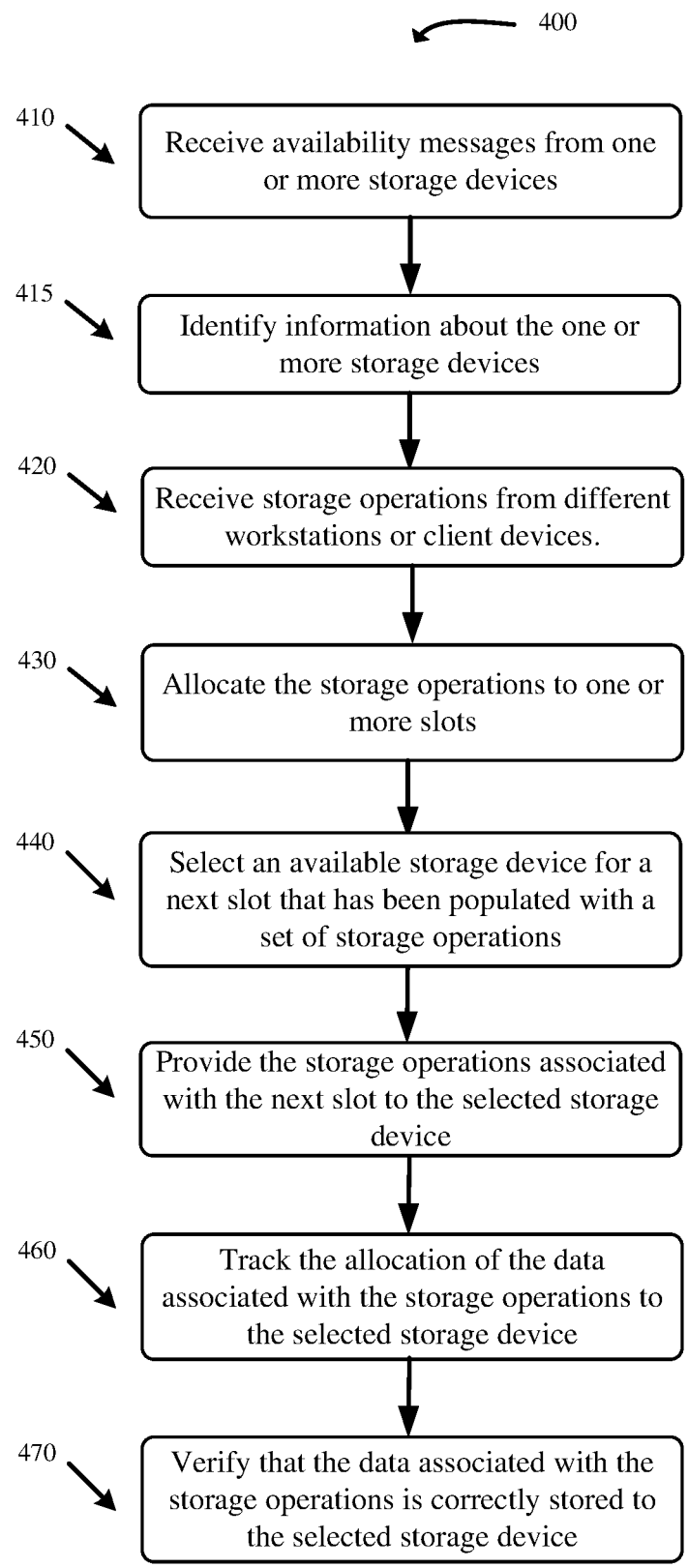
FIG. 4 presents a process for performing availability-driven uneven distribution of storage operations in a mesh fabric storage system in accordance with some embodiments described herein.

FIG. 4 presents a process 400 for performing availability-driven uneven distribution of storage operations in a mesh fabric storage system in accordance with some embodiments described herein. Process 400 may be performed by file system 210 and/or other a system that controls access to a distributed set of storage devices.

Process 400 may include receiving (at 410) one or more availability messages from one or more storage devices that are available to perform storage operations. As noted above, the availability messages may provide a value or identifier that uniquely identifies each storage device. For example, each availability message and may include an IP address, MAC address, and/or other storage device identifier.

Process may include identifying (at 415) information about the one or more storage devices identified by the one or more availability messages. The identifying information may be obtained by comparing timestamps of availability messages that were previously received from the same storage devices. In some such embodiments, file system 210 may track the timestamps for previously received availability messages, and may associate the timestamps to the identifier of the issuing storage device. The identifying information may also be obtained based on mesh fabric file system querying the one or more storage devices for information such as device type (e.g., solid-state disk, magnetic disk, flash memory, etc.), storage capacity, write rate, read rate, etc.

Asynchronous from and/or concurrent with receiving (at 410) the availability messages, process 400 may also include receiving (at 420) one or more storage operations from different workstations or client devices. The storage operations may include requests to write data and/or blocks of data to storage. The storage operations may also include request to read data and/or blocks of data from storage. The storage operations may originate from one or more applications running on one or more workstations or client devices.

Process 400 may include allocating (at 430) the storage operations to one or more slots. The slots may correspond to the frequency at which file system 210 issues storage operations or blocks of storage operations to the storage devices. Each slot may be allocated with a set amount of data or blocks for entry into storage. For instance, the storage devices may be configured to read and write data in 4 Kilobyte (Kb) blocks, and each slot may include storage operations for writing 64 blocks or 256 Kb of data. In some embodiments, the allocation of blocks to slots may be arranged so that blocks for the same file or data are stored to the same storage device. In some other embodiments, the allocation of blocks to slots may be arranged so that blocks for the same file or data are distributed to different storage devices to parallelize storage of the file.

Process 400 may include selecting (at 440) an available storage device for a next slot that has been populated with a set of storage operations. The selection is based on at least one the received (at 410) availability messages. If more two or more storage devices are available to process the set of storage operations for the next slot, process 400 may use additional criteria to select (at 440) between the available storage devices.

In some embodiments, the selection (at 440) between two or more storage devices may be based on the distribution of a prior set of slots and/or storage operations to the available storage devices. The storage device with the oldest slot receipt time may be prioritized. In some embodiments, the selection (at 440) between two or more storage devices may also or alternatively be based on available storage capacity or the percentage of unused storage on each available storage device. For instance, process 400 may prioritize the available storage device with the most available storage capacity or the largest percentage of unused storage. Prioritizing the storage device with the most available storage capacity may provide a more proportionate distribution of data across the storage devices and/or better balance load across the storage devices. Available storage capacity or percentage of unused storage may be misleading when the storage devices include a mix of faster but smaller solid-state disks (e.g., less than one terabyte) and slower but larger magnetic disk (e.g., tens of terabytes). Accordingly, in some embodiments, the selection (at 440) between two or more storage devices may be based on device type. For instance, file system 210 may prioritize selection (at 440) of magnetic disk storage devices over solid-state disk storage devices for reasons of capacity and cost. Moreover, it may be more beneficial to assign storage operations as soon as a slower performing storage device is available so that usage of the slower performing storage devices is maximized thereby better balancing the allocation of load between the faster performing storage devices and the slower performing storage devices.

In some embodiments, file system 210 may obtain the type of each storage device and/or other characteristics (e.g., performance, capacity, etc.) of each storage device by querying, at one time or periodically, each storage device that provides an availability message. In some embodiments, file system 210 may determine the type of each storage device and/or other characteristics based on the rate, timestamps, frequency, and/or other parameters associated with the availability messages sent by each storage device. For instance, a faster performing storage device (e.g., indicative of a lower capacity solid-state disk or flash memory) may issue availability messages at a faster rate than a slower performing storage device (e.g., indicative of a higher capacity magnetic disk).

As noted above, if no storage devices are available to process the set of storage operations for the next slot, file system 210 may increase its buffer and temporarily store the set of storage operations until a storage device becomes available. Alternatively, file system 210 may select a storage device based on past availability messages that were sent by the storage devices in order for the selected storage device to queue or buffer the set of operations.

Process 400 may include providing (at 450) the one or more storage operations associated with the next slot to the selected storage device. In some embodiments, providing (at 450) the storage operations comprises encapsulating the data associated with the one or more storage operations in a packet comprising a write instruction, addressing the packet to the selected storage device, and sending the packet to the selected storage device over a digital network. The network address for the storage device may be obtained from the availability message that is received (at 410) from the selected storage device. In some embodiments, providing (at 450) the storage operations comprises issuing the data associated with the one or more storage operations directly to a controller of the selected storage device over a connected communication bus or interface (e.g., fiber channel, ATA, SCSI, SAS, PCIe, universal serial bus (USB), firewire, thunderbolt, and/or other interfaces).

Process 400 may include tracking (at 460) the allocation of the data associated with the one or more storage operations to the selected storage device as metadata or other data in file system 210. The tracked data allows file system 210 to read back the data from the correct storage device. For instance, if a file is written as a first set of blocks to a first storage device and a second set of blocks to a second storage device, file system 210 tracks the allocation of the blocks to the different storage devices so that the file can be read back seamlessly with the file system 210 obscuring the distributed storage of the file from the workstation or client that accesses the file.

Process 400 may also include verifying (at 470) that the data associated with the one or more storage operations is correctly stored to the selected storage device. Verification may be complete in response to receiving another availability message from the selected storage device. Alternatively, the selected storage device may provide an acknowledgement or confirmation message when the storage operation is complete.

If storage to the selected storage device cannot be verified within a threshold amount of time (e.g., the selected storage device experiences a failure), file system 210 may send a purge command to the selected storage device to delete the data associated with the one or more storage operations, and may repeat 440-470 to send the one or more storage operations to a different storage device in the mesh fabric storage system accessed and/or controlled by file system 210. Process 400 may restart or repeat until all storage operations have been successfully completed.

In some embodiments, the availability-driven uneven distribution of storage operations may result in faster storage devices receiving a greater load or storing more data than slower storage devices. Although the greater load on the faster storage devices may correspond to the actual load that the faster storage device can handle, the disproportionate storage of data may be problematic as the faster storage devices are likely to have less capacity than the slower storage devices. Even when capacity of the storage devices is about equal, disproportionate storage on a first set of storage devices may cause the first set of storage devices to become slower performing, full, and/or eventually unavailable. With less available storage devices (e.g., unavailability of the first set of storage device), a greater load may be placed on a second set of storage devices (e.g., from the previous load on the second set of storage devices and the shifted load from the first set of storage devices).

Figure 5:
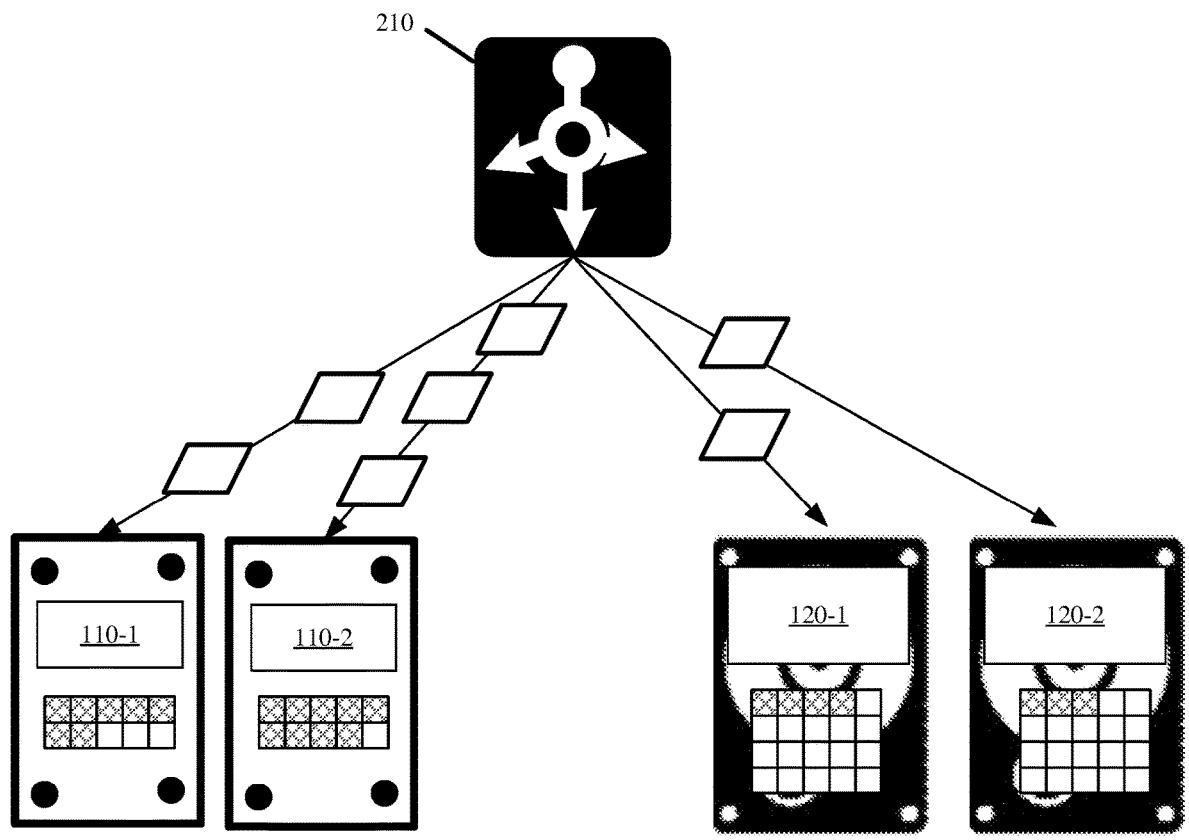
FIG. 5 illustrates an example of data that may allocated to storage devices as a result of the availability-driven uneven distribution of storage operations in accordance with some embodiments described herein.

FIG. 5 illustrates an example of data that may be allocated to storage devices 110-1, 110-2, 120-1, and 120-2 as a result of the availability-driven uneven distribution of storage operations in accordance with some embodiments described herein. Storage devices 110-1 and 110-2 have less capacity than storage devices 120-1 and 120-2 as represented by the number of blocks or squares in each storage device 110-1, 110-2, 120-1, and 120-2. However, since storage devices 110-1 and 110-2 are faster performing, storage devices 110-1 and 110-2 may receive a disproportionate amount of the storage operations and data as represented by the pattern filled blocks or squares.

To optimize storage of the storage devices operating as part of the mesh fabric storage system without compromising performance, some embodiments perform an automatic reallocation of the data between the storage devices. In some embodiments, the availability-driven uneven distribution of storage operations is used to write or store data across the mesh fabric storage system in the quickset possible manner, and the automatic reallocation is performed afterwards to rebalance usage of the storage devices and/or free capacity on the fastest performing storage devices.

The automatic reallocation may be coordinated and controlled by file system 210. File system 210 may track the allocation of data to different storage devices when performing the availability-driven uneven distribution of storage operations. For instance, file system 210 may track the number of storage operations that are issued to each storage device and/or track the amount of data that is stored on the different storage devices.

Based on the tracked allocation, file system 210 may determine capacity usage across the storage devices, and also may determine the fastest performing storage devices based on the availability messaging provided by the storage devices. File system 210 may then control the storage devices to shift data from the more heavily used, smaller capacity, and/or faster storage devices to the less used, larger capacity, and/or slower storage devices. The automatic reallocation is therefore performed independent of any workstation or user-initiated storage operations or commands.

The automatic reallocation may be performed periodically or triggered based on certain conditions or thresholds being met. For instance, the automatic reallocation may be performed at the end of each day (e.g., midnight), when load on the file system 210 is below a threshold amount, and/or when capacity usage of a particular storage device exceeds a threshold amount of total capacity.

In some embodiments, the automatic reallocation may be performed in parallel with the availability-driven uneven distribution of storage operations. For instance, file system 210 may perform the availability-driven uneven distribution of storage operations while simultaneously performing a secondary availability-driven distribution that moves data from one set of storage devices to another set of storage devices in the mesh fabric storage system.

File system 210 may select the data to move from a first storage device to a second storage device based on various criteria. In some embodiments, the selection of data to move as part of the automatic reallocation may include selecting infrequently accessed data, data that is intermittently used as opposed to data that is frequently accessed over the same period of time, data generated from secondary applications as opposed to primary applications, data that is part of large or small files, specific type of data (e.g., metadata, video data, application data, etc.), and/or data with other storages or access characteristics. Primary applications may include the most heavily or frequently used applications on a workstation, or applications that access the most amount of data on a workstation. Secondary applications may include all applications other than the primary applications on the same workstation.

File system 210 may distribute move commands to cause the storage devices to transfer the selected data between one another. Transferring the selected data may include moving the selected data from a first storage device to a second storage device of the mesh fabric storage system, and then deleting the selected data from the first storage device. After the selected data is moved and/or the move commands triggering the move of the selected data are issued from file system 210, file system 210 may update the metadata and/or other tracking information used to track the allocation of data or blocks of data across the storage devices of the mesh fabric storage system.

Figure 6:
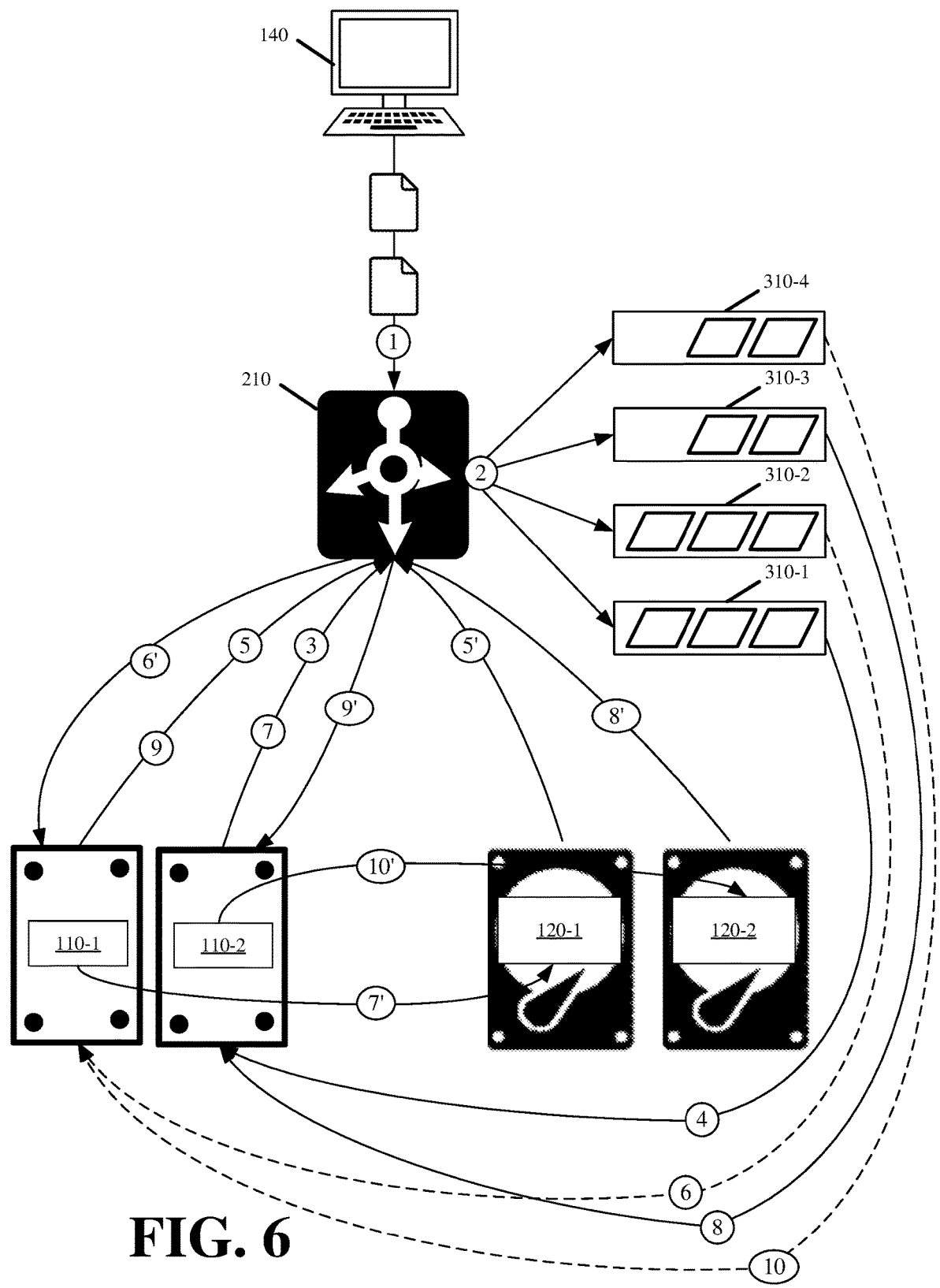
FIG. 6 illustrates an example of automatic reallocation across the mesh fabric storage system in accordance with some embodiments described herein.

FIG. 6 illustrates an example of automatic reallocation across the mesh fabric storage system in accordance with some embodiments described herein. As before, file system 210 may receive storage operations from one or more workstations and/or client devices 140, and may allocate the storage operations and/or data associated with the storage operations into different slots that are assigned to storage devices 110-1, 110-2, 120-1, and/or 120-2 based on storage devices 110-1, 110-2, 120-1, and/or 120-2 signaling their availability to perform the storage operations to file system 210.

In FIG. 6, file system 210 may receive availability messages from storage devices 110-1 and 110-2 more frequently than from storage devices 120-1 and 120-2 because storage devices 110-1 and 110-2 may be faster performing (e.g., flash memory) than storage devices 120-1 and 120-2 (e.g., magnetic disk). As a result, file system 210 may partition storage devices 110-1 and 110-2 into a first set of storage devices for initial storage, and storage devices 120-1 and 120-2 into a second set of storage devices for rebalanced storage.

In response to receiving (at 3, 5, 7, and 9) availability messages from storage devices 110-1 and 110-2, file system 210 may unevenly distribute (at 4, 6, 8, and 10) the storage operations allocated to different slots 310 to the faster performing storage devices 110-1 and 110-2 in order to write out the received storage operations as fast as possible.

The uneven distribution may result in disproportionate capacity usage on storage devices 110-1 and 110-2. Accordingly, file system 210 may use slower performing storage devices 120-1 and 120-2 to balance the capacity usage. In response to receiving (at 5') an availability message from storage device 120-1, file system 210 may distribute (at 6') a first move command to storage device 110-1. The first move command may cause storage device 110-1 to move (at 7') certain data and/or blocks of data to storage device 120-1. Moving the data from storage device 110-1 may include deleting the data from storage device 110-1 after the data is transferred (e.g., written) to storage device 120-1. In response to receiving (at 8') an availability message from storage device 120-2, file system 210 may distribute (at 9') a second move command to storage device 110-2. The second move command may cause storage device 110-2 to move (at 10') certain data and/or blocks of data to storage device 120-2. File system 210 may update the metadata used to track where the moved data and/or blocks of data are stored so that subsequent requests to access that data can be retrieved from the correct storage device. In some embodiments, storage devices 110-1 and 110-2 from which data is moved may create pointers that track the movement of the data to storage devices 120-1 and 120-2 respectively.

The secondary availability-driven distribution that moves data from one set of storage devices to another set of storage devices therefore rebalances capacity usage across the mesh fabric storage system. The capacity rebalancing is achieved while providing the one or more workstations that generate the data the faster performance of the first set of storage devices with the larger capacity of the slower performing second set of storage devices.

In some embodiments of the automatic reallocation, file system 210 may include all storage devices (e.g., the first set of storage devices including storage devices 110-1 and 110-2 as well as the second set of storage devices including storage devices 120-1 and 120-2) during the availability-driven uneven distribution of storage operations. File system 210 may perform the secondary availability-driven distribution that moves data from one set of storage devices to another set of storage devices when the number of storage operations being generated by the one or more workstations is below a threshold (e.g., does not exceed the storage performance of a first set of faster performing storage device) and/or based on other triggering criteria. For instance, file system 210 may issue the move commands for the secondary availability-driven distribution when the number of received storage operations is below a first threshold and the usage of a first set of storage devices exceeds a second threshold. In this manner, the data may be reallocated while still providing the fastest storage performance associated with all storage devices writing the data as it is generated by the one or more workstations.

Figure 7:
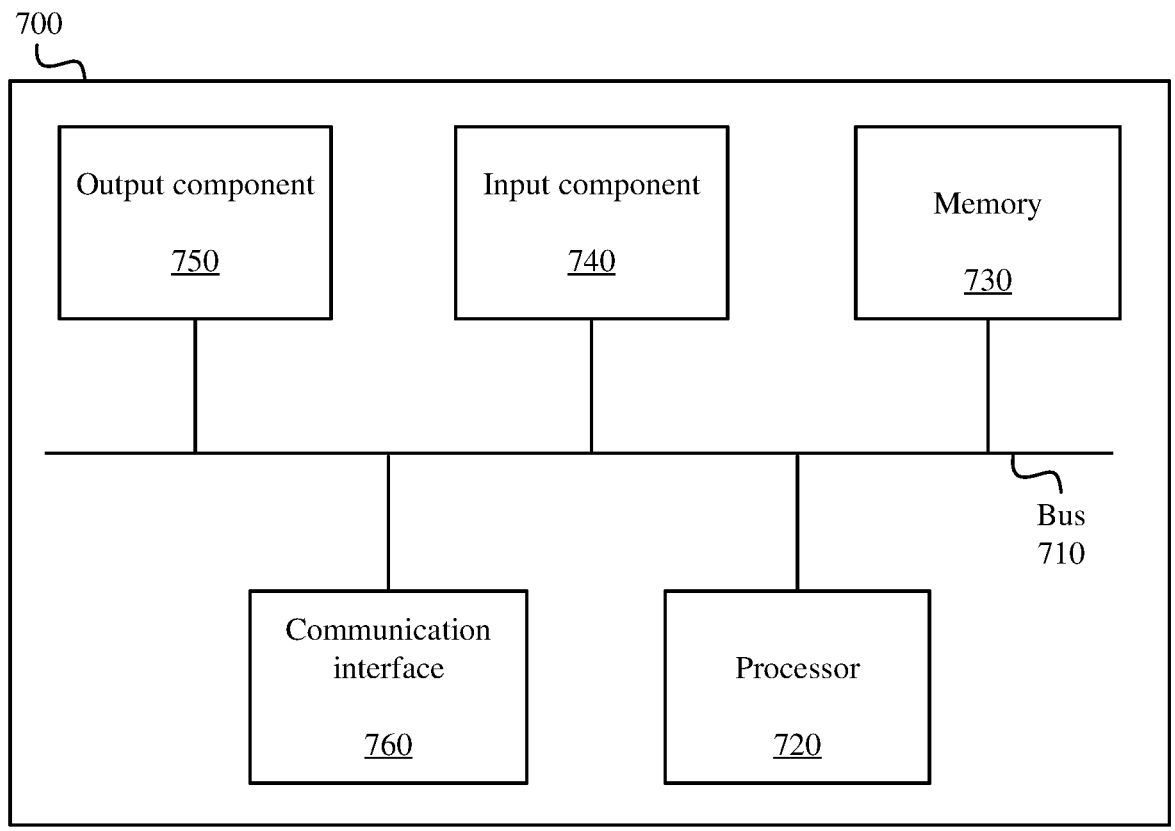
FIG. 7 illustrates example components of one or more devices, according to one or more embodiments described herein.

FIG. 7 is a diagram of example components of device 700. Device 700 may be used to implement certain of the devices or components of the system described above (e.g., file system 210, workstation 140, and storage nodes with storage devices 110-1, 110-2, 120-1 and/or 120-2). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   determining that a first storage device and a second storage device are each available for performing one or more storage operations;
   determining that storage performance provided by the first storage device is worse than storage performance provided by the second storage device;
   receiving a set of storage operations;
   changing a rate or frequency with which the set of storage operations are assigned between the first storage device and the second storage device by prioritizing distribution of storage operations to the first storage device and deprioritizing distribution of storage operations to the second storage device based on one or more of the storage performance and storage availability of the first storage device and the second storage device; and
   providing an uneven distribution of the set of storage operations across the first storage device and the second storage device as a result of changing the rate or frequency and determining that the first storage device and the second storage device are each available, wherein providing the uneven distribution comprises distributing a first subset of the set of storage operations to the first storage device until a buffer of the first storage device is full, and a second subset of the set of storage operations to the second storage device after filling the buffer of the first storage device in response to the first and second storage devices being available and said prioritizing the distribution of the storage operations to the first storage device, wherein the first subset of storage operations comprises more storage operations than the second subset of storage operations.

2. The method of claim 1 further comprising:
wherein providing the uneven distribution further comprises commencing operation of the first storage device before operation of the second storage device in response to the first and second storage devices being available and the storage performance provided by the first storage device being worse than the storage performance provided by the second storage device.

3. The method of claim 1 further comprising:
determining that available storage on the first storage device is less than available storage on the second storage device after completion of the set of storage operations;
adjusting the rate or frequency by decreasing the rate or frequency of storage operations assigned to the first storage device and increasing the rate or frequency of storage operations assigned to the second storage device in response to the second storage device having more available storage than the first storage device; and
distributing a third subset of storage operations to the first storage device and a fourth subset of storage operations to the second storage device in response to adjusting the rate or frequency, wherein the third subset of storage operations comprises fewer storage operations than the fourth subset of storage operations.

4. The method of claim 1 further comprising:
tracking availability of the first storage device and the second storage device based on availability messages issued by the first storage device and the second storage device.

5. The method of claim 4 further comprising:
determining the storage performance of the first storage device and the second storage device based on different rates at which the first storage device and the second storage device issue the availability messages.

6. The method of claim 1 further comprising:
configuring a set of slots at a file system receiving the set of storage operations;
allocating different subsets of the set of storage operations to different slots of the set of slots; and
wherein changing the rate or frequency comprises modifying a number of slots from the set of slots that are assigned to the first storage device and to the second storage device.

7. The method of claim 1 further comprising:
receiving availability messages from a third storage device and a fourth storage device;
determining that the third storage device received a last storage operation after the fourth storage device;
receiving a new storage operation;
selecting the fourth storage device over the third storage device for execution of the new storage operation based on the third storage device receiving the last storage operation after the fourth storage device; and
distributing the new storage operation to the fourth storage device in response to said selecting.

8. The method of claim 1, wherein the set of storage operations is a first set of storage operations, the method further comprising:

receiving a second set of storage operations while the first storage device and the second storage device are busy completing the first set of storage operations;
modifying the rate or frequency with which the second set of storage operations are assigned between the first storage device and the second storage device based on a rate at which the first storage device and the second storage device report completion of different storage operations from the first set of storage operations; and
providing a distribution of the second set of storage operations across the first storage device and the second storage device that is different than a distribution of the first set of storage operations in response to said modifying.

9. The method of claim 1 further comprising:
tracking distributed storage of a file across the first storage device and the second storage device based on the uneven distribution of the set of storage operations.

10. The method of claim 9, wherein tracking the distributed storage comprises:
tracking a first set of storage blocks of the first storage device used in storing a first set of data of the file, and a second set of storage blocks of the second storage device used in storing a second set of data of the file; and
issuing read operations for the first set of storage blocks to the first storage device, and read operations for the second set of storage blocks to the second storage device in response to a request to retrieve the file.

11. The method of claim 1 further comprising:
redistributing data stored as part of the first subset of the set of storage operations from the first storage device to the second storage device in response to storage capacity of the second storage device being greater than storage capacity of the first storage device and in response to load on the first storage device and the second storage device being less than a threshold amount after completion of the set of storage operations.

12. A device comprising:
one or more processors configured to:
determine that a first storage device and a second storage device are each available for performing one or more storage operations;
determine that storage performance provided by the first storage device is worse than storage performance provided by the second storage device;
receive a set of storage operations;
change a rate or frequency with which the set of storage operations are assigned between the first storage device and the second storage device by prioritizing distribution of storage operations to the first storage device and deprioritizing distribution of storage operations to the second storage device based on one or more of the storage performance and storage availability of the first storage device and the second storage device; and
provide an uneven distribution of the set of storage operations across the first storage device and the second storage device as a result of changing the rate or frequency and determining that the first storage device and the second storage device are each available, wherein providing the uneven distribution comprises distributing a first subset of the set of storage operations to the first storage device until a buffer of the first storage device is full, and a second subset of the set of storage operations to the second storage device after filling the buffer of the first storage device in response to the first and second storage devices being available and said prioritizing the distribution of the storage operations to the first storage device, wherein the first subset of storage operations comprises more storage operations than the second subset of storage operations.

13. The device of claim 12, wherein
providing the uneven distribution further comprises commencing operation of the first storage device before operation of the second storage device in response to the first and second storage devices being available and the storage performance provided by the first storage device being worse than the storage performance provided by the second storage device.

14. The device of claim 12, wherein the one or more processors are further configured to:
determine that available storage on the first storage device is less than available storage on the second storage device after completion of the set of storage operations;
adjust the rate or frequency by decreasing the rate or frequency of storage operations assigned to the first storage device and increasing the rate or frequency of storage operations assigned to the second storage device in response to the second storage device having more available storage than the first storage device; and
distribute a third subset of storage operations to the first storage device and a fourth subset of storage operations to the second storage device in response to adjusting the rate or frequency, wherein the third subset of storage operations comprises fewer storage operations than the fourth subset of storage operations.

15. A method comprising:
determining that a first storage device and a second storage device are each available for performing one or more storage operations;
receiving a set of storage operations;
changing a rate or frequency with which the set of storage operations are assigned between the first storage device and the second storage device based on one or more of storage performance and storage availability of the first storage device and the second storage device;
providing an uneven distribution of the set of storage operations across the first storage device and the second storage device as a result of changing the rate or frequency and determining that the first storage device and the second storage device are each available, wherein providing the uneven distribution comprises assigning a different number of the set of storage operations to the first storage device than to the second storage device;
receiving availability messages from a third storage device and a fourth storage device;
determining that the third storage device received a last storage operation after the fourth storage device;
receiving a new storage operation;
selecting the fourth storage device over the third storage device for execution of the new storage operation based on the third storage device receiving the last storage operation after the fourth storage device; and
distributing the new storage operation to the fourth storage device in response to said selecting.

16. A device comprising:
one or more processors configured to:
determine that a first storage device and a second storage device are each available for performing one or more storage operations;
receive a set of storage operations;
change a rate or frequency with which the set of storage operations are assigned between the first storage device and the second storage device based on one or more of storage performance and storage availability of the first storage device and the second storage device;
provide an uneven distribution of the set of storage operations across the first storage device and the second storage device as a result of changing the rate or frequency and determining that the first storage device and the second storage device are each available, wherein providing the uneven distribution comprises assigning a different number of the set of storage operations to the first storage device than to the second storage device;
receive availability messages from a third storage device and a fourth storage device;
determine that the third storage device received a last storage operation after the fourth storage device;
receive a new storage operation;
select the fourth storage device over the third storage device for execution of the new storage operation based on the third storage device receiving the last storage operation after the fourth storage device; and
distribute the new storage operation to the fourth storage device in response to said selecting.

17. A method comprising:
determining that a first storage device and a second storage device are each available for performing one or more storage operations;
receiving a first set of storage operations;
changing a rate or frequency with which the set of storage operations are assigned between the first storage device and the second storage device based on one or more of storage performance and storage availability of the first storage device and the second storage device;
providing an uneven distribution of the first set of storage operations across the first storage device and the second storage device as a result of changing the rate or frequency and determining that the first storage device and the second storage device are each available, wherein providing the uneven distribution comprises assigning a different number of the first set of storage operations to the first storage device than to the second storage device;
receiving a second set of storage operations while the first storage device and the second storage device complete the first set of storage operations;
modifying the rate or frequency with which the second set of storage operations are assigned between the first storage device and the second storage device based on a rate at which the first storage device and the second storage device report completion of different storage operations from the first set of storage operations; and
providing a distribution of the second set of storage operations across the first storage device and the second storage device that is different than a distribution of the first set of storage operations in response to said modifying.

18. A device comprising:
one or more processors configured to:
determine that a first storage device and a second storage device are each available for performing one or more storage operations;
receive a first set of storage operations;

change a rate or frequency with which the set of storage operations are assigned between the first storage device and the second storage device based on one or more of storage performance and storage availability of the first storage device and the second storage device;

provide an uneven distribution of the first set of storage operations across the first storage device and the second storage device as a result of changing the rate or frequency and determining that the first storage device and the second storage device are each available, wherein providing the uneven distribution comprises assigning a different number of the first set of storage operations to the first storage device than to the second storage device;

receive a second set of storage operations while the first storage device and the second storage device complete the first set of storage operations;

modify the rate or frequency with which the second set of storage operations are assigned between the first storage device and the second storage device based on a rate at which the first storage device and the second storage device report completion of different storage operations from the first set of storage operations; and provide a distribution of the second set of storage operations across the first storage device and the second storage device that is different than a distribution of the first set of storage operations in response to said modifying.

* * * * *